United States Patent
Deschamps et al.

(10) Patent No.: US 12,394,822 B2
(45) Date of Patent: Aug. 19, 2025

(54) POLYMER ELECTROLYTE FOR A LITHIUM METAL POLYMER BATTERY HAVING IMPROVED PERFORMANCE

(71) Applicants: BLUE SOLUTIONS, Ergue-Gaberic (FR); INSTITUT POLYTECHNIQUE DE GRENOBLE, Grenoble (FR); UNIVERSITE D' AIX-MARSEILLE, Marseilles (FR); CENTRE NATIONAL DE LA RECHERCHE SCIENTIFIQUE, Paris (FR)

(72) Inventors: Marc Deschamps, Quimper (FR); Margaud Lecuyer, Combrit (FR); Renaud Bouchet, La Tronche (FR); Ekaterina Pavlenko, Grenoble (FR); Adrien Lassagne, Gieres (FR); Didier Gigmes, Allauch (FR); Adèle Ferrand, Aix-en-Provence (FR); Phan Trang, Marseilles (FR)

(73) Assignees: BLUE SOLUTIONS, Ergue-Gaberic (FR); INSTITUT POLYTECHNIQUE DE GRENOBLE, Grenoble (FR); UNIVERSITE D'AIX—MARSEILLE, Marseilles (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 888 days.

(21) Appl. No.: 17/297,290

(22) PCT Filed: Nov. 25, 2019

(86) PCT No.: PCT/FR2019/052802
§ 371 (c)(1),
(2) Date: May 26, 2021

(87) PCT Pub. No.: WO2020/109711
PCT Pub. Date: Jun. 4, 2020

(65) Prior Publication Data
US 2022/0029197 A1    Jan. 27, 2022

(30) Foreign Application Priority Data

Nov. 27, 2018  (FR) .................................... 1871953

(51) Int. Cl.
*H01M 10/0565* (2010.01)
*C08G 81/02* (2006.01)
*H01M 10/0525* (2010.01)

(52) U.S. Cl.
CPC ...... *H01M 10/0565* (2013.01); *C08G 81/025* (2013.01); *H01M 10/0525* (2013.01);
(Continued)

(58) Field of Classification Search
CPC ......... H01M 10/0565; H01M 10/0525; H01M 2300/0082; H01M 2300/0091;
(Continued)

(56) References Cited

U.S. PATENT DOCUMENTS

| 5,202,009 A | 4/1993 | Andrieu et al. |
| 9,431,677 B2 * | 8/2016 | Bouchet ............... H01M 10/052 |

(Continued)

FOREIGN PATENT DOCUMENTS

| DE | 2621012 A | * 11/1976 | ............ G01M 1/225 |
| JP | 2004253168 | * 9/2004 | ........ H01M 10/0418 |

(Continued)

OTHER PUBLICATIONS

Bouchet, R., Maria, S., Meziane, R et al. Single-ion BAB triblock copolymers as highly efficient electrolytes for lithium-metal batteries. Nature Mater 12, 452-457 (2013). https://doi.org/10.1038/nmat3602 (Year: 2013).*

(Continued)

*Primary Examiner* — Helen Oi K Conley
(74) *Attorney, Agent, or Firm* — Greer, Burns & Crain, Ltd (57) ABSTRACT

A cross-linked copolymer is provided, including at least repeating units of poly(alkylene oxide) and at least repeating units of lithium polystyrene-sulfonyl(trifluoromethylsulfonyl)imide (PSTFSILi), as well the use of such a cross-linked copolymer for preparing a solid polymer electrolyte, a solid polymer electrolyte having the cross-linked copolymer, and a battery, for example a lithium metal polymer (LMP) battery, including the solid polymer electrolyte.

16 Claims, 4 Drawing Sheets

(52) U.S. Cl.
CPC ............... *H01M 2300/0082* (2013.01); *H01M 2300/0091* (2013.01)

(58) Field of Classification Search
CPC ............... H01M 10/052; C08G 81/025; C08G 65/3322; C08G 65/3348; C08G 65/337; C08J 2325/18; C08J 5/2268; Y02E 60/10; C08F 212/20; C08F 212/22; C08F 212/26; C08F 212/30; C08F 2438/02; C08F 293/005; C08L 53/00; C08L 71/02
See application file for complete search history.

(56) References Cited

U.S. PATENT DOCUMENTS

| | | | |
|---|---|---|---|
| 2014/0272600 A1* | 9/2014 | Bouchet | C08F 293/005 528/321 |
| 2015/0263382 A1 | 9/2015 | Mohit | |
| 2016/0156081 A1* | 6/2016 | Wang | H01M 10/486 429/50 |
| 2018/0261883 A1* | 9/2018 | Vallee | H01M 4/382 |
| 2019/0088997 A1 | 3/2019 | Bouchet et al. | |

FOREIGN PATENT DOCUMENTS

| | | | | |
|---|---|---|---|---|
| JP | 2004253168 A | * | 9/2004 | ........ H01M 10/0418 |
| KR | 10-2001-0104955 A | | 11/2001 | |
| WO | 2010/083330 A1 | | 7/2010 | |
| WO | WO2011/091521 | * | 8/2011 | .......... H01M 10/052 |

OTHER PUBLICATIONS

Kasemagi, "Molecular Dynamics Modelling of Block-Copolymer Electrolytes with High t+ Values," 2015 Electrochimica Acta, vol. 175, pp. 47-54 (Year: 2015).*
International Search Report and Written Opinion received for PCT/FR2019/052802, mailed May 28, 2020.
French Search Report received for French Application No. 1871953 dated Jul. 26, 2019.
Bouchet, R., et al., "Single-ion BAB triblock copolymers as highly efficient electrolytes for lithium-metal batteries," Nature Materials, 2013, 6 pages.
Office Action received in Korean Application No. 10-2021-7019492, dated Nov. 20, 2024.

* cited by examiner

POLYMER ELECTROLYTE FOR A LITHIUM METAL POLYMER BATTERY HAVING IMPROVED PERFORMANCE

BACKGROUND

The present invention relates to a cross-linked copolymer comprising at least repeating units of poly(alkylene oxide) and at least repeating units of lithium polystyrene-sulfonyl (trifluoromethylsulfonyl)imide (PSTFSILi), the use of such a cross-linked copolymer for the preparation of a solid polymer electrolyte, a solid polymer electrolyte comprising said cross-linked copolymer, and a battery, for example lithium metal polymer (LMP), comprising said solid polymer electrolyte.

The invention applies typically and non-exclusively to the field of lithium metal polymer batteries, in particular for the production of electric vehicles and/or the storage of intermittent energies of the solar and/or wind power type.

The lithium metal polymer batteries currently on the market are in the form of a thin film rolled several times or several stacked thin films. This rolled or stacked thin film has a thickness of the order of approximately one hundred micrometres and comprises: a negative electrode (anode) ensuring the supply of the lithium ions during discharge; a positive electrode (cathode) acting as a receptacle where the lithium ions are intercalated; a lithium-ion-conductive solid polymer electrolyte, situated between the positive electrode and the negative electrode; and a current collector connected to the positive electrode in order to ensure the electrical connection. The negative electrode is generally constituted by a sheet of metallic lithium or a lithium alloy; the solid polymer electrolyte is generally composed of a polymer based on poly(ethylene oxide) (PEO) and at least one lithium salt; the positive electrode usually comprises an electrode active material, for example based on metal oxide or based on phosphate of the $LiMPO_4$ type, where M represents a metallic cation selected from the group Fe, Mn, Co, Ni and Ti, and one of the combinations of these cations, and optionally carbon; in addition the current collector is generally constituted by a metal sheet. Ion conductivity is ensured by the dissolution of the lithium salt in the PEO. However, PEO does not have a sufficient mechanical strength at the temperatures usually implemented in an LMP battery (60-80° C.), since it becomes a viscous liquid and loses its dimensional stability at these temperatures.

Other PEO-based (co)polymers have been described, such as statistical copolymers of the poly(ethylene oxide-stat-propylene oxide) type (i.e. PEO-stat-PPO), block copolymers of the polystyrene-b-PEO type (i.e. PS-b-PEO), cross-linked PEOs or copolymers comprising acrylate or methacrylate chains on which are branched PEO, in particular in order to reinforce the mechanical properties. It has also been proposed to add to the PEO-based polymer inorganic or organic particles, optionally on nanometric scale, such as particles of aluminium oxide, titanium oxide or cellulose nanofibrils. However, the ion conductivities at 60° C. of the electrolytes based on such polymers remain low. Only the use of positive electrodes having a low active material base weight (low surface capacity) and low currents (<C/15) make it possible to recover a capacity at this temperature. The operating temperature of the batteries currently on the market is thus 80° C. in order to obtain performances in accordance with the envisaged applications.

Furthermore, tests for improving the conductivity of the PEO by adding plasticizers have led to deterioration of the mechanical properties.

Finally, in the solid polymer electrolytes constituted by a lithium salt dissolved in a polyether polymer matrix such as lithium-salt doped PEO, the fraction of the charge carried by the lithium ions (also called cation transport number) is low (of the order of 0.2), due to the strong interaction between the lithium cation and the PEO chains, which limits the electrical performance. The value of the cation transport number determines the portion of current transported by the cation. A low cation transport number leads to the formation of a salt concentration gradient in the thickness of the electrolyte during operation of the battery. This behaviour generates salt depletion at the electrode, resulting in an increase in the resistance of the electrolyte and reduced power performance, and promotes the formation of lithium dendrites, bringing about a drop in the Faraday efficiency and eventually, short circuits.

In order to resolve this problem, international application WO 2013/034848 describes diblock copolymers of AB type or triblock copolymers of BAB type, in which the A block is an unsubstituted poly(ethylene oxide) chain having a number-average molecular weight of less than or equal to 100 kDa and the B block is an anionic polymer capable of being prepared from one or more monomers selected from vinyl monomers and derivatives, said monomers being substituted by the anion of a lithium sulfonyl(trifluoromethylsulfonyl)imide (TFSILi) salt having the following formula:

in which * represents the point of attachment of the anion of said salt to said monomer via a covalent bond or a linear alkyl chain having from 1 to 5 carbon atoms. However, the aforementioned PEO-based diblock copolymers of the AB type or triblock copolymers of the BAB type, despite having a transport number equal to 1, have a lower ion conductivity than PEO alone. Furthermore, their mechanical strength is not optimized.

SUMMARY

The aim of the present invention is to overcome all or part of the drawbacks of the aforementioned prior art and to supply a polymer material, capable of being used in a battery, in particular an LMP battery, in particular in a solid polymer electrolyte, said polymer material having good properties in terms of ion conductivity, in particular at a temperature greater than or equal to 60° C., of cation transport number, and of mechanical strength. It is also desirable to reduce or eliminate dendritic growth within a battery, in particular an LMP battery, and to guarantee good electrochemical performance, in particular in terms of cycling behaviour, Faraday efficiency, said battery being capable of use in complete safety.

These aims are achieved by the invention, which will be described hereinafter.

A first subject of the invention is a cross-linked copolymer, characterized in that it comprises at least repeating units of lithium polystyrene-sulfonyl(trifluoromethylsulfonyl) imide (PSTFSILi) and at least repeating units of poly (alkylene oxide) selected from poly(ethylene oxide) units, poly(propylene oxide) units, poly(ethylene and propylene) oxide units, and one of the mixtures thereof, and in that said cross-linked copolymer is obtained by cross-linking a triblock copolymer of the BAB type, in which:

the A block is a cross-linkable poly(alkylene oxide) capable of being obtained from:

at least one monomer selected from ethylene glycol, propylene glycol and mixtures thereof, or at least one poly(alkylene oxide) oligomer selected from poly (ethylene oxide)s, poly(propylene oxide)s, poly(ethylene and propylene) oxides, and one of the mixtures thereof, and at least one compound comprising at least one cross-linkable alkene or alkyne function, and each of the B blocks is an anionic polystyrene substituted by the anion of a lithium sulfonyl(trifluoromethylsulfonyl)imide salt (TFSILi) and corresponding to the following formula (I):

(I)

in which n denotes the number of lithium styrene-sulfonyl (trifluoromethylsulfonyl)imide moieties for each of the B blocks.

By virtue of the combination of the repeating units of poly(alkylene oxide) and the repeating units of lithium polystyrene-sulfonyl(trifluoromethylsulfonyl)imide, and of the cross-linking, said cross-linked copolymer has good properties in terms of cation transport number, ion conductivity and mechanical strength, to be capable of use in a solid polymer electrolyte and/or in a composite electrode, in particular for an LMP battery.

According to the invention, each B block preferably comprises from 4 to 31 moieties of lithium styrene-sulfonyl (trifluoromethylsulfonyl)imide (STFSILi) and even more preferentially from 5 to 12 moieties of STFSILi. A quite particularly preferred value is 8 moieties of STFSILi for each of the B blocks.

The number-average molecular weight of a B block preferentially ranges from 1.6 to 3.8 kDa.

The lithium salt LiTFSI is directly grafted on the polystyrene, which makes it possible to have a Li⁺ cation transport number equal to 1, while guaranteeing good mechanical strength and good ion conductivity, in particular by means of the cross-linking and the presence of the poly(alkylene oxide)s distributed uniformly in the copolymer.

The cross-linked copolymer can comprise from approximately 10 to 50% by weight PSTFSILi, and preferably approximately 13 to 28% by weight PSTFSILi with respect to the total weight of the cross-linked copolymer. A particularly preferred value is approximately 22% by weight PSTFSILi.

The number-average molecular weight of the A block ranges preferentially from 10 to 50 kDa, and even more preferentially from 15 to 30 kDa. A quite particularly preferred value is 20 kDa.

The A block preferably has a number-average molecular weight less than or equal to 25 kDa.

According to the invention, the A block preferably comprises from 227 to 1136 alkylene oxide moieties, and even more preferentially from 340 to 681 alkylene oxide moieties. A quite particularly preferred value is 454 alkylene oxide moieties.

The A block is preferably a poly(ethylene oxide) or a poly(ethylene and propylene) oxide, and more preferably a poly(ethylene oxide).

The A block preferably comprises a functional polymer having the following formula (II):

(II)

in which $R^1$ is a substituent comprising at least one cross-linkable alkene or alkyne function; CoA is a poly (alkylene oxide) chain selected from the poly(ethylene oxide), poly(propylene oxide), poly(ethylene and propylene) oxide chains, and one of the mixtures thereof, and preferably selected from the poly(ethylene oxide) and poly(ethylene and propylene) oxide chains, and more preferably selected from the poly(ethylene oxide) chains; and p is comprised between 10 and 50, preferably between 6 and 33, and more preferably between 12 and 15.

The A block thus comprises cross-linkable functions uniformly distributed within said A block.

The poly(alkylene oxide) CoA chains are preferably linear.

The substituent $R^1$ can be selected from the alkyl radicals containing at least one alkene or alkyne function, said substituent $R^1$ comprising from 4 to 10 carbon atoms, preferably from 4 to 6 carbon atoms.

According to a preferred embodiment of the invention, the functional polymer of formula (II) corresponds to the following formula (II-a):

(II-a)

in which y is comprised between 11 and 91, preferably 17 and 75, and more preferably 23 and 45; and p is as defined in the invention.

According to a particularly preferred embodiment of the invention, the A block corresponds to the following formula (II-b):

(II-b)

in which y and p are as defined in the invention; M is a substituent comprising a radical initiator capable of initiating the polymerization of the lithium styrene-sulfonyl(trif- luoromethylsulfonyl)imide monomers of the B block and allowing the formation of a covalent bond between the A block and the B block.

The radical initiator in the substituent M can be selected from the alkoxyamines, and nitroxide-mediated radical initiators.

By virtue of the radical initiator, for example of the alkoxyamine type, polymerization of lithium styrene-sulfonyl(trifluoromethylsulfonyl)imide monomers is ensured in a controlled manner, thus making it possible to form the B block while binding it with the A block.

The substituent M can be selected from the alkoxyamines. The C—O alkoxyamine bond can rupture homolytically under the action of temperature, and generate a nitroxide acting as mediator of the polymerization reaction and an initiating radical that adds to the monomer.

In particular, the substituent M corresponds to the following formula (III):

(III)

in which * denotes the point of attachment of M to the terminal oxygen in the A block of formula (II-b), and SG1 denotes a nitroxide radical having the following formula:

in which ** denotes the point of attachment of SG1 to the —CH— radical of M of formula (III).

In the cross-linked copolymer according to the invention, the ratio of the number of moles of alkylene oxide to the number of moles of STFSILi (AO/Li) [respectively the ratio of the number of moles of ethylene oxide to the number of moles of STFSILi (EO/Li)], preferably ranges from 7 to 65, more preferably from 10 to 50, and quite particularly preferably from 15 to 25.

The compound comprising a cross-linkable alkene or alkyne function can be selected from the compounds having the following formula (IV):

X—R'¹—X'  (IV)

in which $R'^1$ is an alkyl group containing at least one alkene or alkyne function, said alkyl group comprising from 4 to 10 carbon atoms, and preferably from 4 to 6 carbon atoms; and X and X', identical or different, are selected independently of one another, from the halogen, carboxylic acid, acyl chloride, ester and aldehyde functions.

X and X' are preferably identical.

According to a particularly preferred embodiment, X and X' are halogens, and more preferably chlorine atoms.

By way of example, the compound comprising a cross-linkable alkene or alkyne function is 3-chloro-2-chloro-1-propene.

The A block is capable of being obtained starting from at least one monomer selected from ethylene glycol, propylene glycol, and mixtures thereof, or at least one poly(alkylene oxide) oligomer selected from poly(ethylene oxide)s, poly(propylene oxide)s, poly(ethylene and propylene) oxides, and mixtures thereof, and at least one compound comprising at least one cross-linkable alkene or alkyne function, preferably by polycondensation.

The poly(alkylene oxide) oligomer can comprise terminal groups of the hydroxyl (—OH), thiol (—SH), primary (—$NH_2$) or secondary (—$NHR^2$, $R^2$=—$CH_3$ or —$C_2H_5$) amines, and preferably of the hydroxyl or primary amine type.

The alkylene oxide oligomer can have a molar mass less than or equal to approximately 5000 g/mol, preferably ranging from approximately 700 to 4000 g/mol, and even more preferably ranging from approximately 1000 to 2000 g/mol.

According to an embodiment of the invention, the alkylene oxide oligomer is selected from the oligomers having the following formulas:

H—[O—($CH_2$)$_x$]$_{y'}$—OH, in which 2 $\leq x \leq 4$, and preferably $x=2$; and $10 \leq y' \leq 91$, preferably $17 \leq y' \leq 75$, and more preferably $23 \leq y' \leq 45$, H—[O—$CH_2$—$CHR^3$]$_{y''}$—OH, in which $R^3$ is an alkyl group having from 1 to 3 carbon atoms, and preferably a methyl group; and $7 \leq y'' \leq 69$, preferably $10 \leq y'' \leq 34$, and more preferably $17 \leq y'' \leq 27$, H—[O—($CH_2$)$_z$—O—($CH_2$—$CHR^4$)$_u$]$_w$—OH, in which $1 \leq z \leq 4$, and preferably $z=1$ or 2; $1 \leq u \leq 2$, and preferably $u=1$; w being such that the molecular weight of the oligomer ranges from approximately 700 to 4000 g/mol, and preferably from approximately 1000 to 2000 g/mol, and more preferably $2 \leq w \leq 23$; and $R^4$ is a hydrogen atom or an alkyl group having from 1 to 3 carbon atoms, and preferably a hydrogen atom or a methyl group; it being understood that the —($CH_2$)$_z$— and —($CH_2$—$CHR^3$)$_u$— aliphatic chains are different, $NH_2$—$CHR^5$—$CH_2$—[O—$CH_2$—$CHR^5$]$_{w'}$—$NH_2$, in which $R^5$ is an alkyl group having from 1 to 3 carbon atoms, and preferably a methyl group; and $5 \leq w' \leq 69$, preferably $12 \leq w' \leq 52$, and more preferably $17 \leq w' \leq 35$, these oligomers being capable of being marketed under the name of Jeffamines® in a wide range of w when $R^5$ is a methyl, and $NH_2$—$CHR^6$—$CH_2$—O—[$CH_2$—$CH_2$—O]$_{w''}$—$CH_2$—$CHR^6$—$NH_2$, in which $R^6$ is an alkyl group having from 1 to 3 carbon atoms, and preferably a methyl group; and $7 \leq w'' \leq 91$, preferably $17 \leq w'' \leq 68$, and more preferably $23 \leq w'' \leq 45$.

The alkylene oxide oligomer is preferably selected from the oligomers of formula H—[O—($CH_2$—$CH_2$)]$_{y'}$—OH as defined in the invention.

The alkylene oxide oligomer is preferably an ethylene oxide oligomer, in particular having a molar mass ranging from approximately 750 to 4000 g/mol, and more preferably ranging from approximately 1000 to 2000 g/mol.

The cross-linked copolymer according to the invention can be prepared by a method comprising the following steps:

i) preparing a cross-linkable poly(alkylene oxide) as defined in the invention, and ii) copolymerizing the cross-linkable poly(alkylene oxide) of step i) with a lithium styrene-sulfonyl(trifluoromethylsulfonyl)imide monomer (STFSILi).

Step i) can in particular comprise the following substeps:

i-a) polycondensing an alkylene oxide oligomer as defined in the invention with at least one compound comprising a cross-linkable alkene or alkyne function as defined in the invention, and i-b) functionalizing the cross-linkable poly(alkylene oxide) obtained in substep i-a) with a substituent M as defined above.

According to a particularly preferred embodiment of the invention, substep i-a) utilizes 3-chloro-2-chloro-1-propene and the oligomer of formula H—[O—(CH$_2$)$_x$]$_{y'}$—OH as defined in the invention, 3-chloro-2-chloro-1-propene being in deficit with respect to the oligomer, in order to form a cross-linkable poly(alkylene oxide) having the following formula:

(II-c)

in which y and p are as defined in the invention.

The polycondensation is generally carried out in a solvent such as THF, in the presence of a strong base such as potassium hydroxide.

Substep i-b) can comprise the replacement of the terminal hydroxyl functions with acrylate functions, in particular in the presence of acryloyl and triethylamine chloride in excess, in a solvent such as THF; followed by the radical addition of a MAMA-SG1 alkoxyamine having the following formula:

MAMA-SG1 in particular in a solvent such as ethanol.

Substep i-b) can thus make it possible to form the cross-linkable poly(alkylene oxide) of formula (II-b) as defined in the invention.

Step ii) of copolymerization can be carried out by mediated radical polymerization, in particular by NMP (nitroxide-mediated radical polymerization).

Step ii) is preferably carried out in a polar solvent such as N,N-dimethylformamide (DMF), dimethylsulfoxide (DMSO), or water, in particular at a temperature ranging from 90 to 120° C., in particular during a period from 2 to 20 hours.

A second subject of the invention is the use of at least one cross-linked copolymer as defined in the first subject of the invention, for the preparation of a solid polymer electrolyte, in particular in a lithium battery, and in particular in a lithium metal battery.

Use of the cross-linked copolymer according to the present invention for preparing a solid polymer electrolyte, in particular in a lithium metal battery, leads to an energy storage device having excellent low temperature performance (approximately 60° C.), in particular a lithium-ion transport number of the order of 1, and an ion conductivity greater than or equal to 10-5 S·cm$^{-1}$ to 60° C. The high transport number makes it possible to limit the formation of a concentration gradient in the electrolyte during discharge (respectively, charge) allowing power performance to be increased (respectively, charging speed). Use of this cross-linked copolymer also makes it possible to limit dendritic growth of the lithium, and thus envisage rapid and reliable recharging. In fact, the problem of lithium metal battery technology is the formation of heterogeneous electrodeposits of lithium (including dendrites) during recharging, which reduces cycling capability and can lead to short-circuits. The cross-linked copolymer according to the present invention also has good mechanical strength, high thermal stability (which ensures the safety of the energy storage devices comprising it), and improved voltage stability (e.g. stability up to 4.5 V vs Li$^+$/Li).

A third subject of the invention is a solid polymer electrolyte, characterized in that it comprises at least one cross-linked copolymer as defined in the first subject, and at least one plasticizer.

The solid polymer electrolyte of the invention has optimized mechanical strength, facilitating in particular the utilization and handling thereof. Furthermore, it has a cation transport number equal to 1, and good ion conductivity, resulting in good resistance to dendritic growth.

The plasticizer can be selected from linear and cyclic carbonates such as propylene carbonate, ethylene carbonate or dimethyl carbonate; fluorinated carbonates such as fluoroethylene carbonate; nitriles such as succinonitrile; lactones such as γ-butyrolactone; liquid linear or cyclic polyethers; fluorinated polyethers; and one of the mixtures thereof.

In fact, the cross-linked copolymer of the invention is capable of absorbing a plasticizer, while retaining good mechanical strength and remaining solid. Furthermore, the presence of the plasticizer makes it possible to obtain a solid polymer electrolyte having improved ion conductivity (e.g. conductivity of at least 1×10$^{-5}$ S/cm at 60° C.).

The liquid linear or cyclic polyether preferably has a molar mass less than or equal to approximately 10000 g·mol$^{-1}$ preferably less than or equal to approximately 2000 g·mol$^{-1}$, and more preferably less than or equal to approximately 600 g·mol$^{-1}$.

Le liquid linear or cyclic polyether can be selected from:
- polyethylene glycols of formula H—[O—CH$_2$—CH$_2$]$_q$—OH, in which q is comprised between 1 and 13,
- glycol ethers of formula R$^7$—[O—CH$_2$—CH$_2$]$_{q'}$—O—R$^{7'}$, in which q' is comprised between 1 and 13 and R$^7$ and R$^{7'}$, identical or different, are linear, branched, or cyclic alkyl groups, capable of comprising from 1 to 10 carbon atoms,
- ethers of formula R$^8$—[CH$_2$—O]$_{q''}$—R$^{8'}$, in which q" is comprised between 1 and 13, R$^8$ and R$^{8'}$, identical or different, are linear, branched or cyclic alkyl groups, capable of comprising from 1 to 10 carbon atoms and optionally heteroatoms,
- cyclic ethers capable of comprising from 2 to 20 carbon atoms, cyclic polyethers capable of comprising from 3 to 40 carbon atoms, and
- one of the mixtures thereof.

The polyether(s) used in the electrolyte of the invention is(are) particularly stable with respect to lithium.

In a preferred embodiment, the plasticizer is a liquid linear or cyclic polyether, and is preferentially selected from tetraethylene glycol dimethyl ether (TEGDME) of formula $CH_3O—(CH_2—CH_2)_4—OCH_3$ (i.e. $R^7$, $R^{7'}=CH_3$ and q'=4) or tetraethylene glycol (TEG) of formula $H—(O—CH_2—CH_2)_4—OH$ (i.e. q=4).

The solid polymer electrolyte according to the present invention can in particular be presented in any appropriate form, for example in the form of a sheet, a film or a membrane. The solid polymer electrolyte according to the invention can be prepared by any technique known to a person skilled in the art, such as for example by coating or by extrusion.

The solid polymer electrolyte according to the present invention can comprise from approximately 60 to 90% by weight of cross-linked copolymer, and preferably from approximately 75 to 85% by weight of cross-linked copolymer, with respect to the total weight of the solid polymer electrolyte.

The solid polymer electrolyte according to the present invention can comprise from approximately 10 to 40% by weight of plasticizer, and preferably from approximately 15 to 25% by weight of plasticizer, with respect to the total weight of the solid polymer electrolyte. This thus makes it possible to guarantee operation of the LMP battery utilizing such an electrolyte, with optimal ion conductivity.

Finally, a fourth subject of the invention is a battery, in particular an LMP battery, comprising;
- a negative electrode comprising metallic lithium or an alloy of metallic lithium,
- a positive electrode, optionally supported by a current collector, and
- a solid polymer electrolyte positioned between the positive electrode and the negative electrode,
- characterized in that the solid polymer electrolyte is as defined in the third subject of the invention.

The composite positive electrode can comprise:
- at least one positive electrode active material,
- at least one polymer binder,
- optionally at least one electron conductive agent, and
- optionally at least one plasticizer.

The composite positive electrode can comprise at least approximately 50% by weight positive electrode active material, and preferably approximately 55 to 85% by weight positive electrode active material with respect to the total weight of said composite positive electrode.

The positive electrode active material can be selected from lithium phosphates, and in particular $LiFePO_4$, $Li_3V_2(PO_4)_3$, $LiCoPO_4$, $LiMnPO_4$, $LiNiPO_4$; lithium oxides such as for example $LiNiO_2$, $LiCoO_2$ and $LiMn_2O_4$ and mixtures thereof.

Among these active materials, $LiFePO_4$ is quite particularly preferred.

According to a particular embodiment, the composite positive electrode comprises from approximately 10 to 40% by weight of polymer binder, and preferably approximately 13 to 20% by weight of polymer binder, with respect to the total weight of the composite positive electrode.

The polymer binder can be a triblock copolymer of the BAB type as defined in the invention (i.e. without cross-linking), or a material selected from ethylene homopolymers and copolymers; propylene homopolymers and copolymers; ethylene oxide homopolymers and copolymers (e.g. PEO, PEO copolymer), methylene oxide, propylene oxide, epichlorohydrin, allyl glycidyl ether, and mixtures thereof; halogenated polymers such as vinyl chloride homopolymers and copolymers, vinylidene fluoride (PVdF), vinylidene chloride, ethylene tetrafluoride, or chlorotrifluoroethylene, vinylidene fluoride and hexafluoropropylene copolymers (PVdF-co-HFP) or mixtures thereof; non electron-conductive polymers of the anionic type such as poly(styrene sulfonate), poly(acrylic acid), poly(glutamate), alginate, pectin, gelatin or mixtures thereof; polymers of the cationic type such as polyethylene imine (PEI), polyaniline in the form of emeraldine salt (ES), quaternized poly(N-vinylimidazole), poly(acrylamide-co-diallyldimethylammonium chloride) (AMAC) or mixtures thereof; polyacrylates; and one of the mixtures thereof.

According to a particularly preferred embodiment of the invention, the polymer binder is a triblock copolymer of the BAB type as defined in the invention (i.e. without cross-linking). By virtue of the triblock copolymer of the BAB type as defined in the invention present in the composite positive electrode, the formation of a concentration gradient in the thickness of the positive electrode during cycling can be reduced, or even eliminated, resulting in an improvement of the power performance of the battery or the possibility of increasing the base weight of the positive electrode.

The composite positive electrode can comprise from approximately 0.05 to 10% by weight of agent generating electron conductivity, and preferably approximately 0.2 to 5% by weight of agent generating electron conductivity, with respect to the total weight of the composite positive electrode.

The agent generating electron conductivity suitable for the present invention is preferably selected from carbon black, carbon sp, acetylene black, carbon fibres and nanofibres, carbon nanotubes, graphene, graphite, metallic particles and fibres, and one of the mixtures thereof.

The agent generating electron conductivity is preferably carbon black.

Preferably, the agent generating electron conductivity is in the form of spherical particles (i.e. in the form of beads) in order to promote conductivity in particular in the direction perpendicular to the composite positive electrode (i.e. in the direction of its thickness) and thus to promote the electrochemical processes within the electrode. In fact, the particles in spherical form of agent generating electron conductivity have a propensity to form three-dimensional conductive matrices.

By way of example of carbon black, there may be mentioned the carbon blacks marketed under the references: Ketjenblack 600JD®, Ketjenblack 700JD® and Timcal Ensaco 350G®.

The composite positive electrode can also comprise at least one plasticizer, said plasticizer being capable of being as defined in the present invention. The plasticizer of the positive electrode is preferably a liquid linear or cyclic polyether as defined in the invention or a linear, cyclic or fluorinated carbonate as defined in the invention.

The composite positive electrode can comprise from approximately 2 to 10% by weight of plasticizer, and preferably approximately 3 to 5% by weight of plasticizer with respect to the total weight of the composite positive electrode.

It should be noted that the total weight of the composite positive electrode comprises the weight of the active material, the weight of the polymer binder, optionally the weight of the agent generating electron conductivity and optionally the weight of the plasticizer if they are present.

According to a preferred embodiment of the invention, the base weight of the positive electrode (i.e. the quantity of positive electrode active material/cm²/face) ranges from 1 to 3 mAh/cm².

The composite positive electrode can be prepared as follows:
a) mixing the positive electrode active material with the polymer binder, optionally the agent generating electron conductivity, optionally the plasticizer, and optionally at least one solvent of said polymer binder, in order to obtain an electrode paste,
b) applying said electrode paste on at least one support,
c) drying said electrode paste to obtain a composite positive electrode in the form of supported film.

Step a) can be carried out by extrusion or by grinding.

Extrusion is very advantageous as it makes it possible to easily obtain electrodes with low porosity while using little solvent. It also makes it possible to avoid a step of pressing the dry electrode, which can result in modifications to the structure of the electrode, detract from efficient coating of the grains of the agent generating electron conductivity and thus can cause structural failure of the electrode during cycling. Finally, the pressing step has the drawback of increasing the number of steps for obtaining the electrode and thus the cost of production thereof.

The solvent of the polymer binder of step a) makes it possible to solubilize said polymer binder.

When it is present, said solvent preferably represents less than approximately 50% by weight of the total weight of the mixture of positive electrode active material, polymer binder, optionally agent generating electron conductivity, and optionally plasticizer.

Use during the manufacture of the composite positive electrode of a small quantity of solvent of the polymer binder makes it possible to result in a positive electrode of low porosity (i.e. approximately 10% by volume). This low porosity makes it possible to control and optimize the quantity of active material present in the composite positive electrode, and thus to achieve optimal volumetric energy densities.

The solvent of step a) can be selected from water; N-methylpyrrolidone; carbonates such as ethylene carbonate, propylene carbonate, dimethyl carbonate, diethyl carbonate or methyl and ethyl carbonate; acetone; alcohols such as methanol, ethanol or propanol; and one of the mixtures thereof.

Step b) can be carried out by calendering or by coating.

The support can be a current collector and/or a support film.

By way of example of a current collector, there may be mentioned a current collector made from aluminium covered with a base layer of carbon (anticorrosion layer).

By way of example of a support film, there may be mentioned a plastic film of the silicone-treated polyethylene terephthalate (PET) type.

The positive electrode supported film obtained at the end of step c) can have a thickness ranging from approximately 2 to 100 μm, and preferably from approximately 10 á 60 μm.

Step c) can be carried out at a temperature sufficient to allow the solvent of step a) to be eliminated.

The operating temperature of the battery is from approximately 60 to 100° C.

By virtue of the use of a cross-linked copolymer according to the invention at least in the solid polymer electrolyte, the operating temperature of the battery can be reduced.

The performance of the battery of the invention at 60° C. is better at high regime (e.g. (>C/2)), and similar at low regime (e.g. (C/10)), than that of the batteries available on the market, the operating temperature of which is 80° C., i.e. a saving of 20° C. for equal or better performance.

The present invention is illustrated by the following embodiments, which are nevertheless non-limitative.

DETAILED DESCRIPTION

Examples

The raw materials used in the examples are listed hereinafter:
carbon black, Ketjenblack EC600JD, AkzoNobel,
LiFePO4, Pulead,
PVDF-co-HFP, Solvay,
homo-PEO, Sumitomo Seika,
LiTFSI, Solvay,
current collector made from aluminium covered with a layer of carbon, Armor,
sheet of metallic lithium, Blue Solutions,
PEO oligomer, PEG2000, Sigma-Aldrich,
3-chloro-2-chloro-1-propene,
TEGDME, Sigma-Aldrich,
potassium hydroxide (KOH),
tetrahydrofuran (THF),
diethyl ether,
acetonitrile,
water,
acryloyl chloride,
triethylamine,
dimethylformamide (DMF),
2-Hydroxy-4'-(2-hydroxyethoxy)-2-methylpropiophenone: photoinitiator Irgacure 2959,
Nitroxide SG1 and alkoxyamine MAMA-SG1 having the following formulas:

SG1

MAMA-SG1

Unless otherwise indicated, all the materials were used as received from the manufacturers.

Example 1: Preparation of Cross-Linked Copolymers According to the First Subject of the Invention Preparation of a Cross-Linkable Poly(Ethylene Oxide) Precursor of the A Block
Preparation of a Cross-Linkable Poly(Ethylene Oxide): Sub-step i-a) as Defined in the Invention 127.6 g of a PEO oligomer of 1.5 kDa and 9.5 g KOH are dissolved in 200 ml tetrahydrofuran (THF) at 40° C. When the solution is homogeneous, 10 g 3-chloro-2-chloro-1-propene dissolved in 20 ml THF are added to the solution of PEO oligomer prepared beforehand. The polycondensation reaction was implemented at 40° C. for 3 days. As the 3-chloro-2-chloro-1-propene is in deficit, the cross-linkable poly(ethylene oxide) obtained is terminated by hydroxyl functions.

The reaction medium was then cooled, centrifuged, then the supernatant was precipitated in diethyl ether. The purification is completed by ultrafiltration in order to eliminate the low molecular weight polymers and the salts which were not eliminated in the centrifugation step. Water is eliminated by rotary evaporation and the product is dried under vacuum.

Preparation of a Cross-Linkable Poly(Ethylene Oxide): Sub-step i-b) as Defined in the Invention 26.5 g cross-linkable poly(ethylene oxide) as prepared beforehand was allowed to react at ambient temperature for 15 hours with 7.4 g acryloyl chloride in the presence of 8 g triethylamine in 200 ml tetrahydrofuran. The terminal hydroxyl functions were thus functionalized by the acrylate functions. The residue obtained was precipitated in diethyl ether, filtered, then dried under vacuum.

Then, 2 g alkoxyamine of formula MAMA-SG1 was added to the diacrylate as obtained beforehand, at 80° C. in 50 ml ethanol under inert atmosphere. After 4 hours of reaction, the product obtained was precipitated in diethyl ether, filtered, then dried under vacuum.

Copolymerisation of Cross-Linkable Poly(Ethylene Oxide), Precursor of the A Block, with Lithium Styrene-Sulfonyl (Trifluoromethylsulfonyl)Imide (STFSILi) in Order to Form the BAB Triblock Copolymer: Step ii) as Defined in the Invention 5 g cross-linkable poly(ethylene oxide) containing an initiator as prepared beforehand in 30 ml DMF were allowed to react with 1 g lithium styrene-sulfonyl(trifluoromethylsulfonyl)imide (STFSILi) and 7 mg nitroxide SG1 under inert atmosphere at 120° C. At the end of 16 hours of reaction, approximately 80% of the monomer STFSILi had reacted.

The lithium styrene-sulfonyl(trifluoromethylsulfonyl)imide (STFSILi) can be prepared as described in international patent application WO 2013/034848 A1.

The copolymer obtained was precipitated in diethyl ether, then purified by dialysis in water (cut-off threshold at 3 kg·mol$^{-1}$) before drying by lyophilization.

A BAB triblock copolymer CP-1 according to the invention was obtained comprising 13.1% by weight PSTFSILi with respect to the total weight of the copolymer. This copolymer has a ratio EO/Li of 48.4.

Cross-Linking and Shaping of the Copolymer 100 mg of copolymer as prepared beforehand was placed in solution in 5 ml of an acetonitrile/water mixture (5/1 by volume). 0.9 mg of UV photoinitiator (2-hydroxy-4'-(2-hydroxyethoxy)-2-methylpropiophenone) was introduced into the solution. The resulting solution was then poured into a polypropylene Petri dish (6 cm diameter) placed on a flat surface. The major part of the solvent was evaporated in an oven at 40° C. for 24 hours, then at 60° C. for 12 hours. Then the polymer film obtained was cross-linked under a mercury UV lamp sold under the trade name P300 MT Power supply by Fusion UV System Inc for 30 seconds at 15 mW/cm$^2$ under ambient atmosphere. The film obtained was dried in the glove box to form a cross-linked copolymer $CP_r$-1 according to the invention, comprising 13.1% by weight of PSTFSILi, with respect to the total weight of the copolymer, in a ratio EO/Li of 48.4.

Obtaining Other Copolymers

By modifying the quantity of the STFSILi monomer, other copolymers, cross-linked $CP_r$-2 and $CP_r$-3; and non-cross-linked CP-2 and CP-3 were obtained.

Table 1 below lists the composition of the copolymers obtained:

TABLE 1

| Copolymer | % PSTFSILi | EO/Li ratio | cross-linking |
|---|---|---|---|
| CP-1 | 13.1 | 48.4 | no |
| $CP_r$-1 | 13.1 | 48.4 | yes |
| CP-2 | 22 | 25.9 | no |
| $CP_r$-2 | 22 | 25.9 | yes |
| CP-3 | 28.4 | 18.4 | no |
| $CP_r$-3 | 28.4 | 18.4 | yes |

Example 2: Preparation of Solid Polymer Electrolytes According to the Third Subject of the Invention The cross-linked polymers $CP_r$-1, $CP_r$-2 and $CP_r$-3 in the form of films were quenched in TEGDME as plasticizer for 1 hour in a dry room (dewpoint at −45° C.), then the films obtained were recovered, and the excess plasticizer was removed with a Kimtech paper tissue. The films were weighed before and after absorption of the plasticizer, which makes it possible to deduce the percentage of plasticizer in the films. The average thickness of the films ranges from 30 to 60 μm.

Table 2 below shows the composition of the solid polymer electrolytes obtained:

TABLE 2

| Solid polymer electrolyte | % weight TEGDME | Copolymer | EO/Li ratio |
|---|---|---|---|
| E-1a | 14 | $CP_r$-1 | 59 |
| E-1b | 12.3 | $CP_r$-1 | 57 |
| E-2a | 22.8 | $CP_r$-2 | 40 |
| E-2b | 17.4 | $CP_r$-2 | 35 |
| E-2c | 14.5 | $CP_r$-2 | 33 |
| E-3a | 23.4 | $CP_r$-3 | 30 |
| E-3b | 21.3 | $CP_r$-3 | 28 |
| E-3c | 16 | $CP_r$-3 | 24 |
| E-3d | 18.7 | $CP_r$-3 | 26 |

Example 3: Physico-Chemical Characteristics

Young's Modulus

The Young's modulus (modulus of elasticity) was calculated based on tensile stress vs elongation curves obtained by means of a dynamic mechanical analyzer sold under the trade name of Dynamic Mechanical Analyzer DMA Q800 by the company TA Instruments, at 50° C., with a dry air stream.

Figure 1:
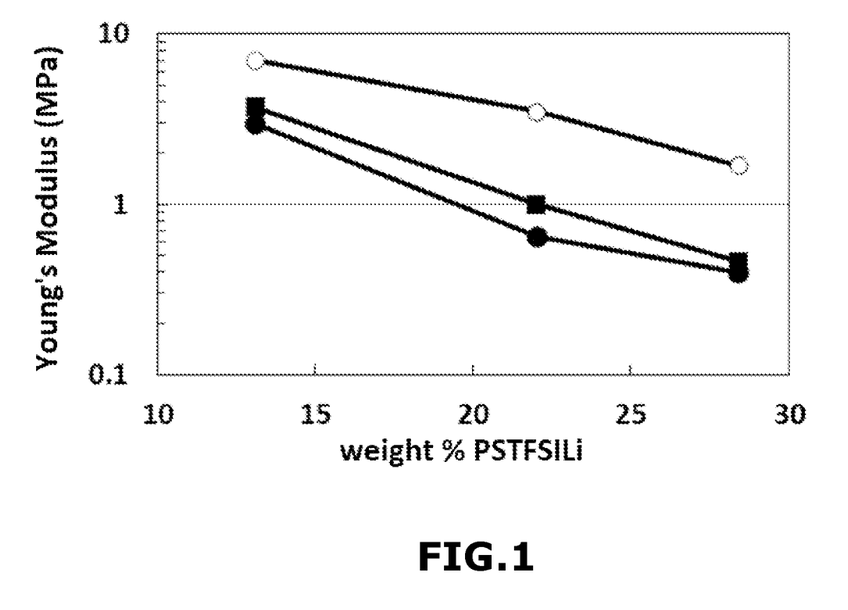
FIG. 1 shows the Young's modulus (in MPa), as a function of the weight percent of PSTFSILi of materials according to the invention and not according to the invention.

The attached FIG. 1 shows the Young's modulus (in MPa) as a function of the weight percent of PSTFSILi in the cross-linked copolymer (in %) (curve with blank circles, copolymers CPr-1, $CP_r$-2 and $CP_r$-3), in the non-cross-linked copolymer (curve with solid circles, copolymers CP-1, CP-2 and CP-3), and in a mixture of cross-linked copolymer and TEGDME plasticizer (curve with solid squares, electrolytes E-1b, E-2b and E-3b). FIG. 1 shows firstly that the cross-linking of the A block in the BAB triblock copolymer has a significant impact on the Young's modulus, since an increase by a factor of 3 to 5 is obtained for one and the same weight percent of PSTFSILi (e.g. 0.46

MPa to 1.7 MPa for the copolymer comprising 28.4% by weight PSTFSILi). Furthermore, this cross-linking makes it possible to obtain sufficient mechanical strength to be able to combine the cross-linked copolymer according to the invention with a plasticizer. In particular, the plasticizing increases the ion conductivity, while guaranteeing a fully acceptable Young's modulus. Thus, a good ion conductivity/mechanical strength compromise is obtained at 50° C. for the solid polymer electrolytes E-1b, E-2b and E-3b. Finally, it is possible to modulate the mechanical strength of the copolymer as a function of the weight percent of PSTFSILi in the cross-linked copolymer.

Ion Conductivity

The ion conductivity was calculated according to the following formula:

$$\sigma = \frac{l}{S * R_{el}}$$

wherein S and l are respectively the surface area and the thickness of the solid polymer electrolyte or of the copolymer. $R_{el}$ is the resistance of the solid polymer electrolyte or of the copolymer determined at high frequency by impedance spectroscopy (VMP300, Bio-Logic) on a Li/solid polymer electrolyte or copolymer/Li symmetrical cell. The temperature is set between 10 and 80° C. by means of a climatic enclosure.

Figure 2:
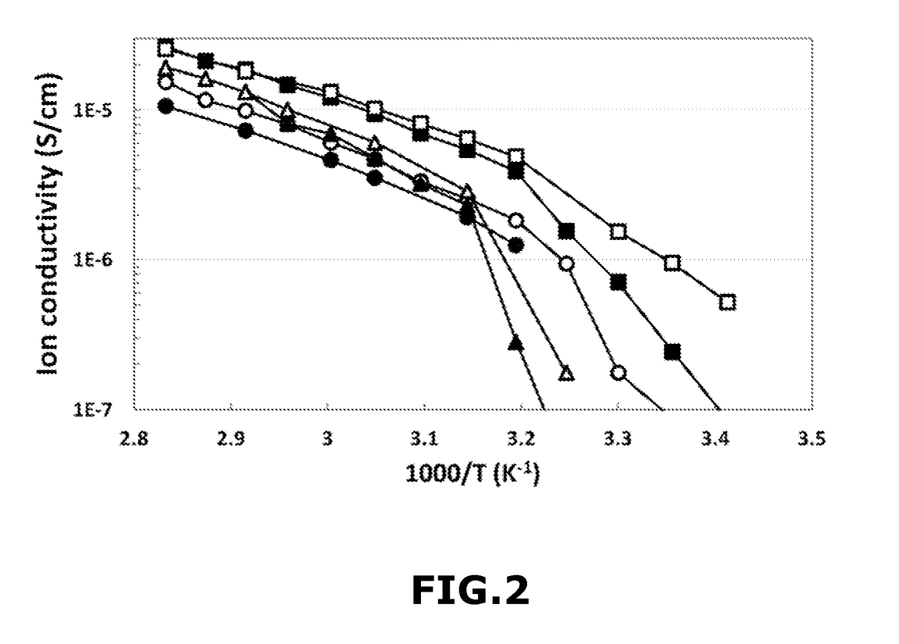
FIG. 2 shows the variation in the ion conductivity (in S/cm) as a function of the ratio 1000/T, T being the temperature in Kelvin for materials according to the invention and not according to the invention.

The attached FIG. 2 shows the variation in the ion conductivity (in S/cm) as a function of the ratio 1000/T, T being the temperature in Kelvin, for the non-cross-linked copolymers CP-2 (curve with solid circles) and CP-3 (curve with solid triangles) for the cross-linked copolymers $CP_r$-2 (curve with blank circles), and $CP_r$-3 (curve with blank triangles) and for the solid polymer electrolytes E-2c (curve with solid squares) and E-3c (curve with blank squares).

FIG. 2 shows that the copolymers without plasticizer have a conductivity of 4 to $8*10^{-6}$ S/cm at 60° C., which is too low for use in a battery, in particular under a high regime and high base weight of the positive electrode (e.g. >0.8 mAh/cm²). Plasticizing by a low quantity of plasticizer makes it possible to achieve a conductivity of $1.3*10^{-5}$ S/cm, without compromising the mechanical stability of the cross-linked copolymer.

Figure 3:
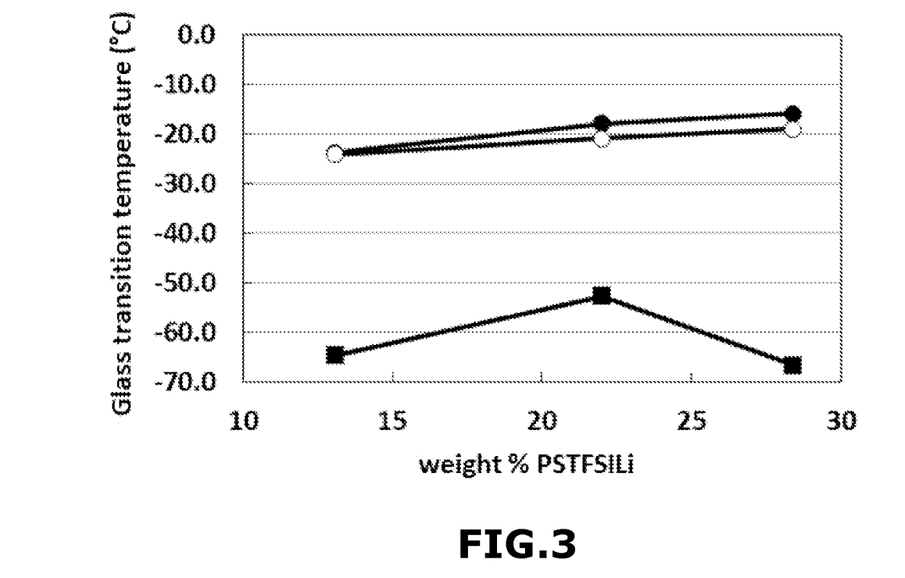
FIG. 3 shows the glass transition temperature (in ° C.), as a function of the weight percent of PSTFSILi of materials according to the invention and not according to the invention.
Figure 4:
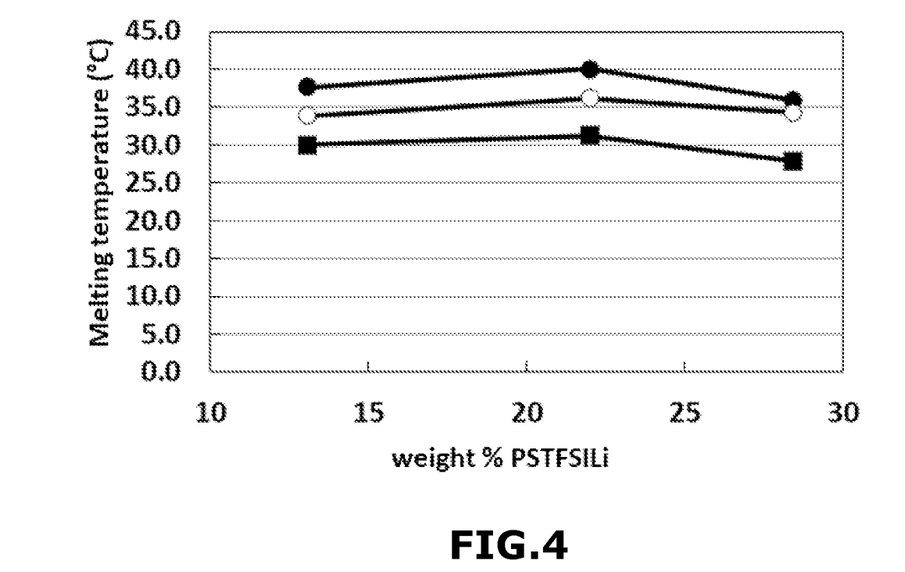
FIG. 4 shows the melting temperature (in ° C.), as a function of the weight percent of PSTFSILi of materials according to the invention and not according to the invention.

FIGS. 3 and 4 show respectively the glass transition temperature in ° C. (FIG. 3) and the melting temperature in ° C. (FIG. 4) as a function of the weight percent of PSTFSILi, for the cross-linked copolymer (curve with blank circles, copolymers $CP_r$-1, $CP_r$-2 and $CP_r$-3), for the non-cross-linked copolymer (curve with solid circles, copolymers CP-1, CP-2 and CP-3), and for the solid polymer electrolyte (curve with solid squares, electrolytes E-1a, E-2a and E-3a).

The glass transition and melting temperatures were obtained by measuring the thermodynamic properties by DSC using an appliance sold under the trade name DSC3 by Mettler-Toledo. The measurements were carried out with the following parameters: 10° C./min between −110° C. and 130° C.

FIGS. 3 and 4 show respectively a marked drop in the glass transition temperature and the melting temperature for the solid polymer electrolyte, with respect to those of the cross-linked and non-cross-linked copolymers. Such temperatures are adapted to obtain an electrolyte having good ion conduction at low temperature (polymer less crystalline), and capable of being implemented in a battery at a lower temperature.

Example 4: Electrochemical Characterizations 4.1 Preparation of a Composite Positive Electrode A composite positive electrode in the form of a film was prepared as follows: a mixture of 46.3 g LiFePO₄, 1.2 g carbon black, 17.5 g copolymer CP-3, 6.5 g deionized water was introduced into a Brabender Plastograph. Mixing was carried out at 60° C. at 80 rpm.

The paste thus obtained was then calendered at 60° C. on a current collector made from aluminium coated with carbon. The film obtained was dried for 10 minutes at 100° C. before use.

The composite positive electrode obtained comprises 71.2% by weight of LFP active material, 26.9% by weight of copolymer CP-3 and 1.9% by weight of carbon black. It has a thickness of approximately 45 μm. The base weight obtained is 1.37 mAh/cm².

An LMP accumulator was prepared by assembly under controlled atmosphere (dewpoint −50° C.) of:
 a film of solid polymer electrolyte E-3d as prepared beforehand, of thickness 58.8 μm,
 a sheet of metallic lithium of thickness approximately 50 μm, and
 a positive electrode as prepared beforehand.

To this end, the sheet of lithium and the film of solid polymer electrolyte are calendered at 70° C. and 5 bars to ensure good Li/electrolyte contact, then finally the composite positive electrode is calendered on the Li/electrolyte assembly in order to form the accumulator. The electrolyte film is placed between the metallic lithium film and the composite positive electrode film. A conductive wire is connected to the lithium and another conductive wire is connected to the current collector of the composite positive electrode.

The accumulator obtained, having a structure of sandwich type, is enclosed under vacuum in a pouch (known as a "coffee bag") to be tested under uncontrolled atmosphere.

An accumulator under a pressure of 1 bar and a surface area of 2.8 cm² was obtained.

During the operation of the accumulator, the TEGDME contained in the solid polymer electrolyte migrates at least partially into the composite positive electrode, in particular until equilibrium is reached between the quantity of TEGDME in the composite positive electrode, on the one hand, and in the solid polymer electrolyte, on the other hand.

Figure 5:
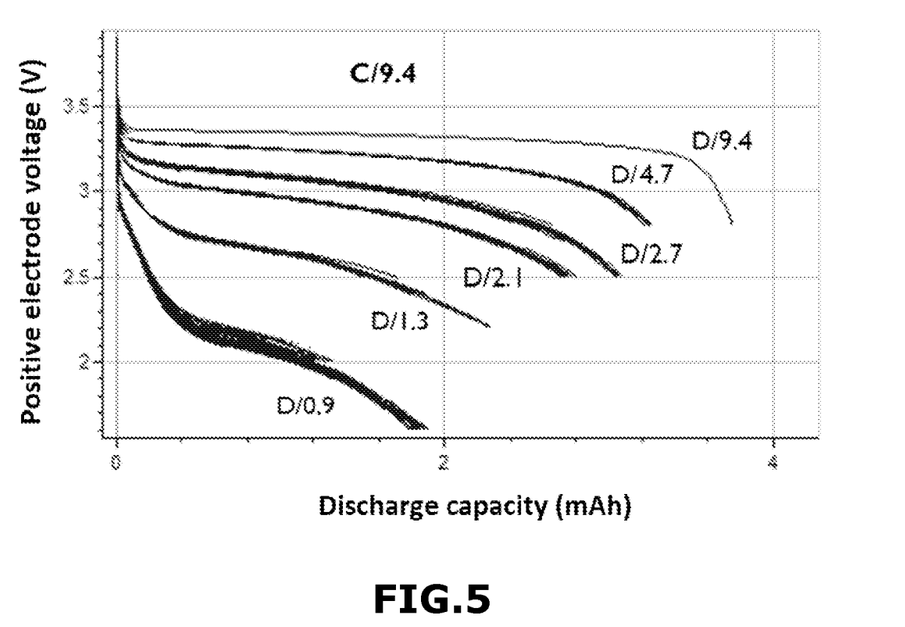
FIG. 5 shows the voltage of a composite positive electrode according to the invention (in volts) as a function of the discharge capacity (in mAh) at 60° C. and at different regimes (from D/9.4 to D/0.9), the load always being C/9.4.

FIG. 5 shows the voltage of the composite positive electrode in volts as a function of the discharge capacity (in mAh) at 60° C. and at different regimes (from D/9.4 to D/0.9), the load always being C/9.4. D represents the nominal capacity in mAh, and D/n, a discharge current corresponding to obtaining the capacity D in n hours. The polarization is proportional to the current density applied, which is typical for the single-ion type polymers, as the ion transport is ensured by migration only. Thus, the capacity values obtained are highly dependent on the low-voltage cutoff terminal.

Figure 6:
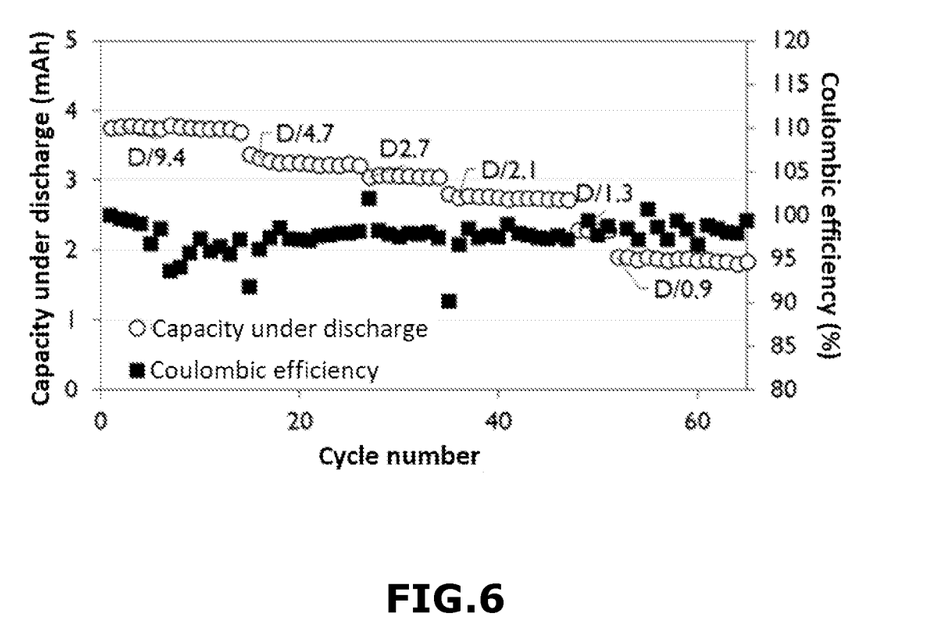
FIG. 6 shows the curve of the discharge capacity (in mAh) and the coulombic efficiency (in %), as a function of the number of cycles, at 60° C. and at different discharge regimes (from D/9.4 to D/0.9), the load always being C/9.4.

FIG. 6 shows the curve of the discharge capacity (in mAh) and the coulombic efficiency (in %), as a function of the number of cycles, at 60° C. and at different discharge regimes (from D/9.4 to D/0.9), the charge always being C/9.4. Very good cycling strength is obtained over more than 60 cycles, associated with a faradic yield of 98.4%.

Figure 7:
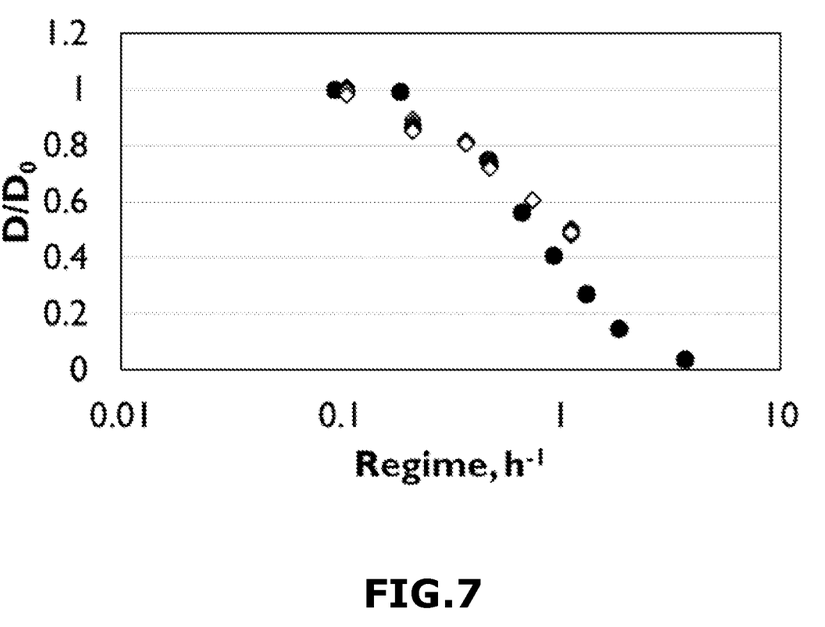
FIG. 7 represents the power performances of two LMP batteries, according to the invention and not according to the invention.

FIG. 7 shows the comparison of the power performances of two LMP batteries:
- a first LMP battery (curve with blank diamonds) operating at 60° C. comprising a solid polymer electrolyte E-3d and a composite positive electrode as defined above, and
- a second LMP battery currently used in industry (curve with solid circles) operating at 80° C. comprising a solid polymer electrolyte including 48% by weight of homo-PEO, 12% by weight of LiTFSi lithium salt, and 40% by weight of PVdF-co-HFP, and a positive electrode containing 68% by weight of LFP active material, 24% by weight of homo-PEO, 6% by weight of LiTFSi lithium salt and 2% by weight of carbon black and having a thickness of approximately 60 μm and a base weight of 1.5 mAh/cm².

FIG. 7 shows the discharge capacity normalized by the nominal capacity ($D/D_0$) as a function of the discharge regime ($D/n$) for the aforementioned batteries.

The results obtained are remarkable, taking account of the thickness of the solid polymer electrolyte (58.8 μm), the very high base weight of the electrode (1.37 mAh/cm²), for a composite positive electrode initially not plasticized. They show that the solid polymer electrolytes of the invention have better performance than that of the commercial electrolytes at high regimes and equal at low cycling regimes.

The invention claimed is:

1. A cross-linked copolymer, comprising: at least repeating units of lithium polystyrene-sulfonyl(trifluoromethylsulfonyl)imide (PSTFSILi) and at least repeating units of poly(alkylene oxide) selected from poly(ethylene oxide) units, poly(propylene oxide) units, poly(ethylene and propylene) oxide units, and one of the mixtures thereof, and wherein said cross-linked copolymer is obtained by cross-linking a triblock copolymer having a BAB structure, in which:
   an A block is a cross-linkable poly(alkylene oxide) comprising cross-linkable alkene or alkyne functions uniformly distributed within said A block, said A block being obtained by reacting:
   i) at least one monomer selected from ethylene glycol, propylene glycol and mixture thereof, or at least one poly(alkylene oxide) oligomer selected from poly(ethylene oxide)s, poly(propylene oxide)s, poly(ethylene and propylene) oxides, and one of the mixtures thereof,
   with
   ii) at least one compound comprising at least one cross-linkable alkene or alkyne function,
   said A block comprising a functional polymer having the following formula (II):

—[CoA—R¹]$_p$—  (II)

in which R¹ is a substituent comprising at least one cross-linkable alkene or alkyne function selected from the alkyl radicals containing at least one alkene or alkyne function, said substituent R¹ comprising from 4 to 10 carbon atoms; CoA is a poly(alkylene oxide) chain selected from the poly(ethylene oxide), poly(propylene oxide), poly(ethylene and propylene) oxide chains, and one of the mixtures thereof; and p is comprised between 10 and 50, and
   each B block is an anionic polystyrene substituted by the anion of a lithium sulfonyl(trifluoromethylsulfonyl)imide (TFSILi) and corresponding to the following formula (I):

in which n denotes the number of lithium styrene-sulfonyl (trifluoromethylsulfonyl)imide for each of the B blocks.

2. The cross-linked copolymer according to claim 1, wherein said polymer comprises from 10 to 50% by weight PSTFSILi with respect to the total weight of the cross-linked copolymer.

3. The cross-linked copolymer according to claim 1, wherein the A block has a number-average molecular weight less than or equal to 25 kDa.

4. The cross-linked copolymer according to claim 1, wherein the functional polymer of formula (II) corresponds to the following formula (II-a):

in which y is comprised between 11 and 91.

5. The cross-linked copolymer according to claim 1, wherein the ratio of the number of moles of alkylene oxide to the number of moles of STFSILi (AO/Li) ranges from 7 to 65.

6. The cross-linked copolymer according to claim 1, wherein the compound comprising a cross-linkable alkene or alkyne function is 3-chloro-2-chloromethyl-1-propene.

7. The cross-linked copolymer according to claim 1, wherein the poly(alkylene oxide) oligomer has a molar mass ranging from 700 to 4000 g/mol.

8. A use of at least one cross-linked copolymer as defined in claim 1, for the preparation of a solid polymer electrolyte.

9. A solid polymer electrolyte, wherein said electrolyte comprises at least one cross-linked copolymer as defined in claim 1, and at least one plasticizer.

10. The solid polymer electrolyte according to claim 9, wherein the plasticizer is selected from the linear and cyclic carbonates; fluorinated carbonates; nitriles; lactones; liquid linear or cyclic polyethers; fluorinated polyethers; and one of the mixtures thereof.

11. The solid polymer electrolyte according to claim 9, wherein the plasticizer is a liquid linear or cyclic polyether of molar mass less than or equal to 10000 g·mol⁻¹, selected from:
   i) polyethylene glycols of formula H—[O—CH₂—CH₂]$_q$—OH, in which q is comprised between 1 and 13,
   ii) glycol ethers of formula R⁷—[O—CH₂—CH₂]$_{q'}$—O—R⁷', in which q' is comprised between 1 and 13 and R⁷ and R⁷', identical or different, are linear, branched or cyclic alkyl groups, iii) ethers of formula $R^8$—[$CH_2$—O]$_{q''}$—$R^{8t}$, in which q" is comprised between 1 and 13, $R^8$ and $R^{8t}$, identical or different, are linear, branched or cyclic alkyl groups,
iv) the cyclic ethers, the cyclic polyethers; and
v) one of the mixtures thereof.

12. The solid polymer electrolyte according to claim 9, wherein said electrolyte comprises from 10 to 40% by weight of plasticizer, with respect to the total weight of the solid polymer electrolyte.

13. A battery comprising:
a negative electrode comprising metallic lithium or an alloy of metallic lithium;
a positive electrode, optionally supported by a current collector;
a solid polymer electrolyte positioned between the positive electrode and the negative electrode; and
the solid polymer electrolyte is as defined in claim 9.

14. The battery according to claim 13, wherein the composite positive electrode comprises:
at least one positive electrode active material;
at least one polymer binder;
optionally at least one electron conductive agent;
optionally at least one plasticizer; and
said polymer binder being a BAB triblock copolymer having at least repeating units of lithium polystyrene-sulfonyl(trifluoromethylsulfonyl)imide (PSTFSILi) and at least repeating units of poly(alkylene oxide) selected from poly(ethylene oxide) units, poly(propylene oxide) units, poly(ethylene and propylene) oxide units, and one of the mixtures thereof, and wherein said cross-linked copolymer is obtained by cross-linking a triblock copolymer having a BAB structure, in which:
an A block is a cross-linkable poly(alkylene oxide) comprising cross-linkable alkene or alkyne functions uniformly distributed within said A block, said A block being obtained from:
i) at least one monomer selected from ethylene glycol, propylene glycol and mixture thereof, or at least one poly(alkylene oxide) oligomer selected from poly (ethylene oxide)s, poly(propylene oxide)s, poly(ethylene and propylene) oxides, and one of the mixtures thereof,
and
ii)* at least one compound comprising at least one cross-linkable alkene or alkyne function, and
each B block is an anionic polystyrene substituted by the anion of a lithium sulfonyl(trifluoromethylsulfonyl) imide (TFSILi) and corresponding to the following formula (I):

(I)

in which n denotes the number of lithium styrene-sulfonyl (trifluoromethylsulfonyl)imide for each of the B blocks.

15. A solid polymer electrolyte, wherein it comprises at least one cross-linked copolymer comprising: at least repeating units of lithium polystyrene-sulfonyl(trifluoromethylsulfonyl)imide (PSTFSILi) and at least repeating units of poly(alkylene oxide) selected from poly(ethylene oxide) units, poly(propylene oxide) units, poly(ethylene and propylene) oxide units, and one of the mixtures thereof, and wherein said cross-linked copolymer is obtained by cross-linking a triblock copolymer having a BAB structure, in which:
an A block is a cross-linkable poly(alkylene oxide) comprising cross-linkable alkene or alkyne functions uniformly distributed within said A block, said A block being obtained by reacting:
i) at least one monomer selected from ethylene glycol, propylene glycol and mixture thereof, or at least one poly(alkylene oxide) oligomer selected from poly(ethylene oxide)s, poly(propylene oxide)s, poly(ethylene and propylene) oxides, and one of the mixtures thereof, with
ii) at least one compound comprising at least one cross-linkable alkene or alkyne function selected from the compounds having the following formula (IV):

in which $R^{r1}$ is an alkyl group comprising at least one alkene or alkyne function, said alkylene group comprising from 4 to 10 carbon atoms; and X and X', identical or different, are selected independently of one another, from the halogen, carboxylic acid, acyl chloride, ester and aldehyde functions, and
each B block is an anionic polystyrene substituted by the anion of a lithium sulfonyl(trifluoromethylsulfonyl) imide (TFSILi) and corresponding to the following formula (I):

(I)

in which n denotes the number of lithium styrene-sulfonyl (trifluoromethylsulfonyl)imide for each of the B blocks, and
and at least one plasticizer comprising from 10-40% by weight, with respect to the total weight of the solid polymer electrolyte.

16. The cross-linked copolymer according to claim 1, wherein the compound comprising a cross-linkable alkene or alkyne function is selected from the compounds having the following formula (IV):

(IV)

in which $R^{r1}$ is an alkyl group comprising at least one alkene or alkyne function, said alkyl group comprising from 4 to 10 carbon atoms; and X and X', identical or different, are selected independently of one another, from the halogen, carboxylic acid, acyl chloride, ester and aldehyde functions.

\* \* \* \* \*